United States Patent [19]

Yoshida

[11] Patent Number: 4,901,656
[45] Date of Patent: Feb. 20, 1990

[54] INFORMATION DISPLAY APPARATUS FOR A SEWING MACHINE

[75] Inventor: Noriyuki Yoshida, Nagoya, Japan

[73] Assignee: Brother Kogyo Kabushiki Kaisha, Aichi, Japan

[21] Appl. No.: 268,980

[22] Filed: Nov. 9, 1988

[30] Foreign Application Priority Data

Nov. 13, 1987 [JP] Japan ................................ 62-288262

[51] Int. Cl.[4] ...................... D05B 13/02; D05B 19/00; D05B 3/02; D05B 87/04
[52] U.S. Cl. ................................ 112/121.11; 112/445
[58] Field of Search ............... 112/445, 454, 456, 458, 112/453, 457, 121.11, 121.12

[56] References Cited

U.S. PATENT DOCUMENTS

| | | | |
|---|---|---|---|
| 4,301,753 | 11/1981 | Meier | 112/445 X |
| 4,341,170 | 7/1982 | Beckerman et al. | 112/445 |
| 4,502,402 | 3/1985 | Kato | 112/445 |
| 4,531,466 | 7/1985 | Hanyu et al. | 112/121.11 |
| 4,811,673 | 3/1989 | Yoshida | 112/445 |

Primary Examiner—Peter Nerbun
Attorney, Agent, or Firm—Barnes & Thornburg

[57] ABSTRACT

An information display apparatus for a sewing machine is disclosed which comprises an information memory means storing various instructing information on how to use the sewing machine, explanatory information explaining the method of sewing each of a plurality of stitch patterns and the like, an information selecting means, a liquid crystal display of multirow-multicolumn dot-pattern type, and a display controlling means, and is constituted so as to be able to display the above-mentioned various information by characters and images.

7 Claims, 15 Drawing Sheets

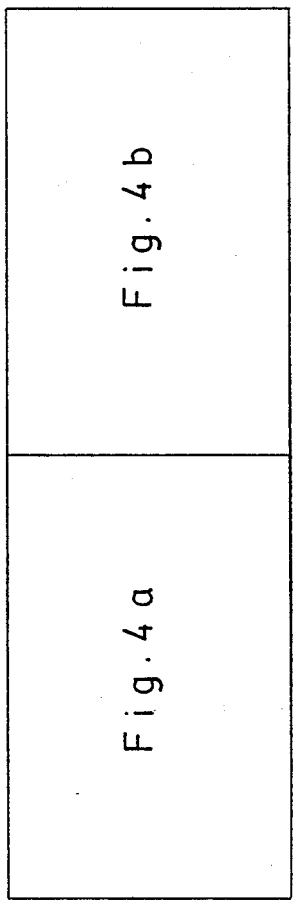

Fig. 6.e
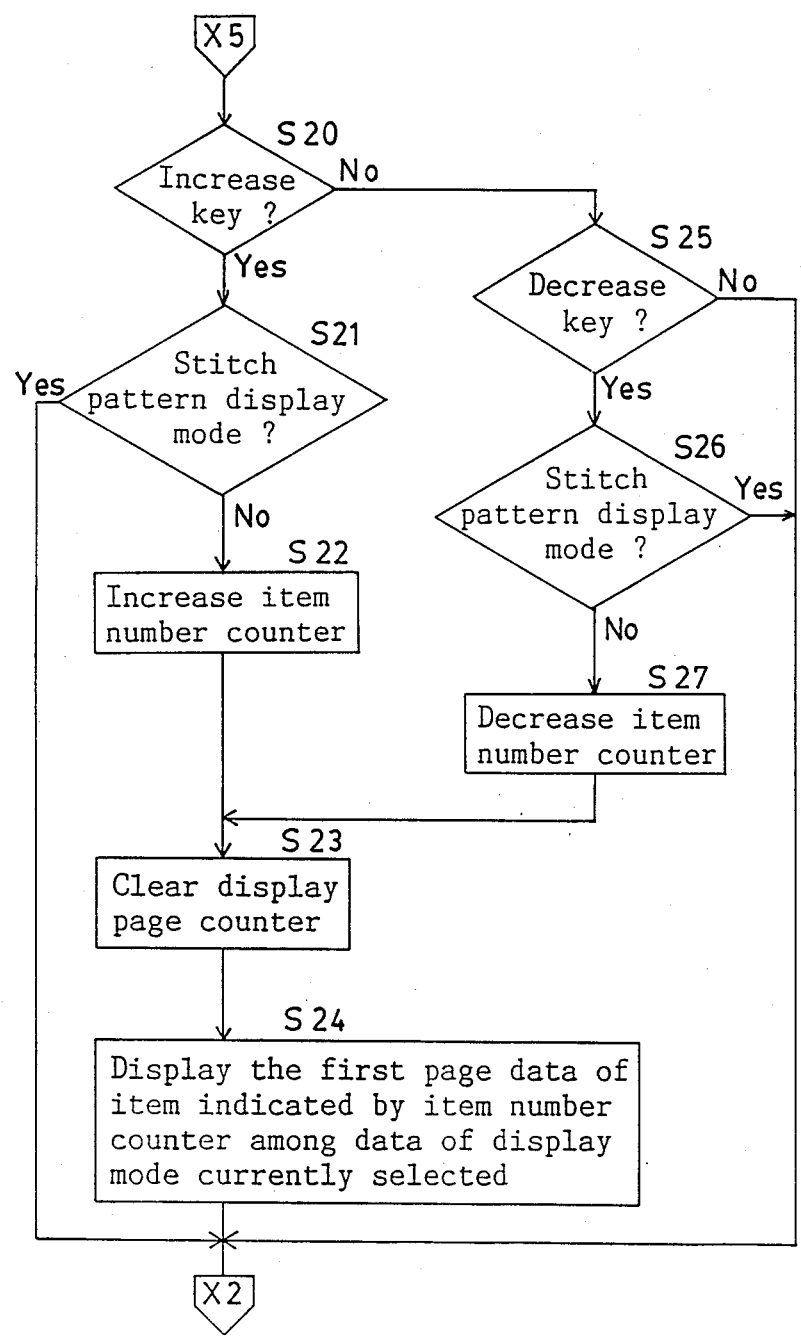

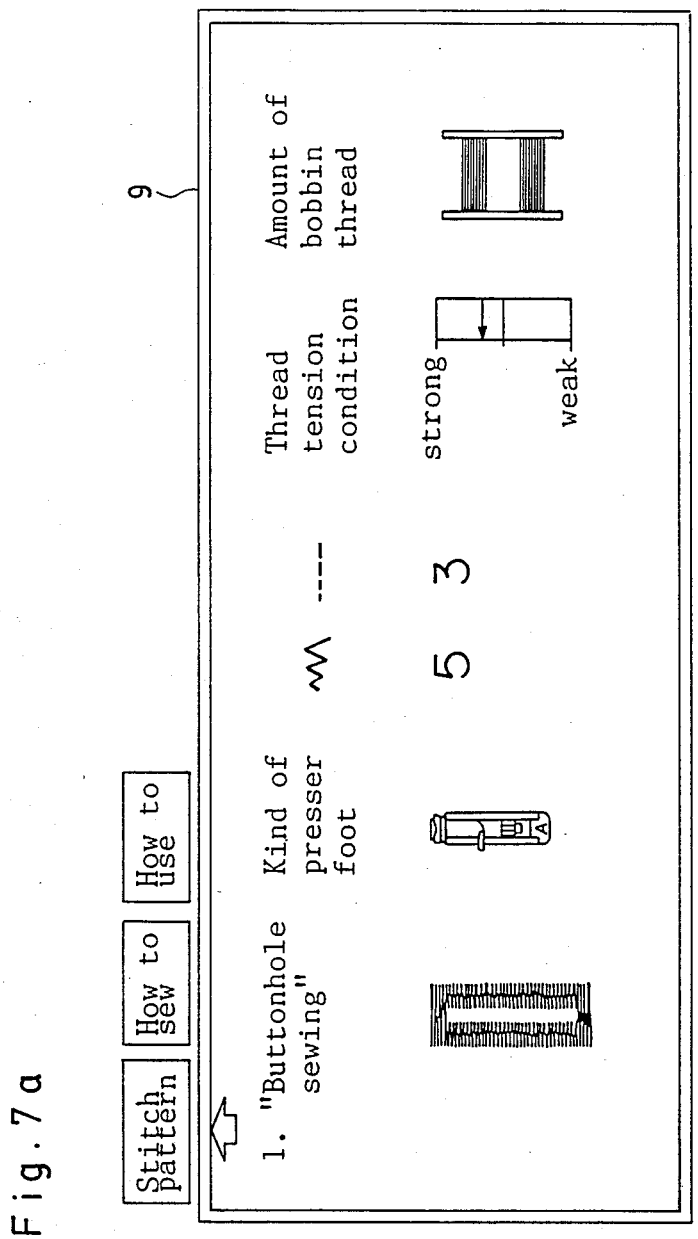

| Stitch pattern | How to sew | How to use |

1/3

1. How to set needle thread

1. Lift the presser foot and the needle.
2. Set the needle thread in the sequence as shown by arrows 1 to 6.
   · First, set the needle thread in the thread guide as indicated by the arrow 1.

Stitch pattern | How to sew | How to use

⟨The motor has been locked !!⟩
Check for the causes in sequence.
· Check whether the needle is bent or snapped or not.
· Check whether the thread is got entangled in the looptaker or not.
· Check whether dust collects around the feed dog or not.

Ga!
Ga!

INFORMATION DISPLAY APPARATUS FOR A SEWING MACHINE

BACKGROUND OF THE INVENTION

The present invention relates to an information display apparatus for a sewing machine which comprises an information memory means for storing information on the using methods of using a sewing machine and methods of sewing plural stitch patterns in a classified fashion and a display, and can selectively display the above-mentioned information.

In the recent zigzag sewing machine with electronic control system, in addition to straight stitch and zigzag stitch, plural kinds of stitch pattern sewings such as buttonhole sewing, button sewing, triple stitch, overlock stitch, overedge stitch, stitch pattern sewing of character, mark, and the like can be performed.

It is difficult to select a desired stitch pattern from among the above-mentioned large number of patterns and a suitable amount of feed and a suitable oscilating width, and therefore display apparatuses for a zigzag sewing machine with electronic control system have been proposed in the U.S Pat. Nos. 4,236,467, 4,499,836 and 4,651,663.

In the information display apparatus of the U.S. Pat. No. 4,236,467, a plurality of amounts of adjustments (such as oscilating width and amount of feed) optimum for forming a selected stitch pattern and the kinds of suitable presser feet are displayed on a plurality of corresponding displays, and the above-mentioned amounts of adjustments and the presser feet are kept displayed by numeric values and symbols unless the selection of the stitch pattern is changed. Also, in the U.S. Pat. Nos. 4,499,836 and 4,651,663, a plurality of amounts of adjustments suitable for the selected stitch pattern or a plurality of amounts of adjustments set by the operator are displayed on a display.

The information display apparatuses for the zigzag sewing machine described in the above-mentioned Patent Publications display a minimum of information required for sewing the selected pattern, but displaying only the amounts of adjustments and the kinds of presser feet is not enough for preferable sewing, and it is desirable to give a larger amount of information to the unskilled operator.

Then, the applicant of the present invention has proposed an information display apparatus for a zigzag sewing machine wherein, as shown in the U.S. Pat. Ser. No. 07/082,597, data of optimum set values for each stitch pattern adjusted by an adjusting means and messages of either of sewing work for forming each stitch pattern and the method of forming each stitch pattern can be displayed on a 16-character display in a selective change-over manner.

This information display apparatus also is not configurated in a manner that in sewing, information on general methods of using the sewing machine such as method of setting needle thread, method of winding bobbin thread and method of attaching the side cutter is displayed.

Accordingly, for example, when setting the needle thread from the thread spool anew, the operator not skilled in the method of setting the needle thread takes out the handling manual every time, opens the page of "how to set needle thread", and sets the needle thread in sequence while reading the explanation, and thus there exists a problem of taking much time not only for the needle thread setting operation but also for other preparating works.

Furthermore, when selecting a stitch pattern requiring complicated works of buttonhole sewing, button sewing and the like, the operator necessitates the work of taking out the handling manual and opening the page whereon the required method of sewing is described also if he or she does not know how to sew (sewing machine operation), and thus there exists the problem of taking much time also when sewing the stitch pattern.

SUMMARY OF THE INVENTION

A first object of the present invention is to provide an information display apparatus for a sewing machine which can display general instructing information on methods of using a sewing machine on a display.

A second object of the present invention is to provide an information display apparatus for a sewing machine which can display explanatory information on sewing machine operations required for sewing each of a plurality of stitch patterns on a display.

A third object of the present invention is to provide an information display apparatus for a sewing machine which can display stitch pattern information explaining each of a plurality of stitch patterns and warning information in an abnormal event.

Another object of the present invention is to provide an information display apparatus for a sewing machine which can perform a detailed display with characters and images.

An information display apparatus for a sewing machine in accordance with the present invention comprises an information memory means for storing various information as mentioned above, a selecting means for selecting desired information, a display for displaying the selected information, and a display controlling means. The information memory stores various information in the form of dot pattern data so as to be able to display it with characters and images on the display. The display is constituted with a liquid crystal display of multirow-multicolumn dot pattern type.

BRIEF DESCRIPTION OF THE DRAWINGS

FIG. 1 through FIG. 7d show embodiments in accordance with the present invention.

FIG. 1 is a perspective view of a zigzag sewing machine with electronic control system.

FIG. 2 is a configuration view of a thread tension condition dial.

FIG. 3 is a cross-sectional view showing a horizontal rotating looptaker, a bobbin and an apparatus for detecting the residual amount of bobbin thread.

FIG. 4 is a block diagram of a control system of the sewing machine as shown in FIG. 1.

FIG. 5 is a block diagram of a control apparatus of the display control part as shown in FIG. 4.

FIG. 6a through 6e are flow charts of routines of display control.

FIG. 7a through 7d show an example of display of pattern data, an example of display of data of sewing method, an example of display of data of using method, and an example of display of warning data, respectively.

DETAILED DESCRIPTION OF THE PREFERRED EMBODIMENTS

Hereinafter, description is made on embodiments in accordance with the present invention based on drawings.

Figure 1:
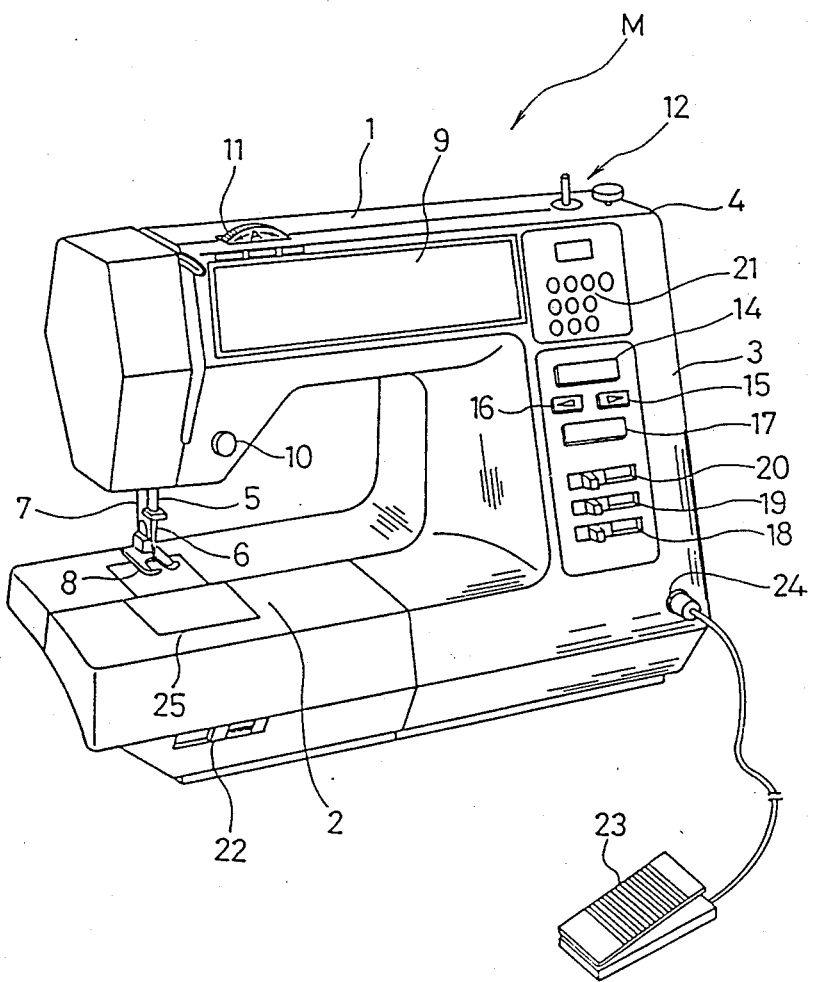

FIG. 1 shows a zigzag sewing machine with electronic control system applying the present invention.

A needle bar vertical driving apparatus, a needle bar oscilation driving apparatus and a take-up lever driving apparatus are incorporated in an arm 1 of this sewing machine M. A feed lifting driving apparatus for vertical motion of a feed dog for feeding fabric and a horizontal feed driving apparatus for horizontal motion of the feed dog are incorporated in a bed 2. The needle bar oscilation driving apparatus and the horizontal feed driving apparatus are driven respectively by pulse motors 46 and 47 (refer to FIG. 4) which are controlled by a controlling apparatus C1, and the needle bar vertical driving apparatus, the take-up lever driving apparatus and the vertical feed driving apparatus are driven by a main motor (DC motor) 48 (refer to FIG. 4). In addition, numeral 5 designates a needle bar, numeral 6 designates a needle, numeral 7 designates a presser bar, and numeral 8 designates a presser foot.

A large-type liquid crystal display 9 configurated with 120 dots in vertical direction ×640 dots in horizontal direction, a start/stop switch 10 for starting and stopping sewing operation, a needle thread tension condition dial 11 for adjusting the thread tension condition of the needle thread from the strong state to the weak state, and a bobbin thread winding apparatus 12 for winding the bobbin thread on a bobbin 26 are installed in the arm 1 of this sewing machine M.

Figure 2:
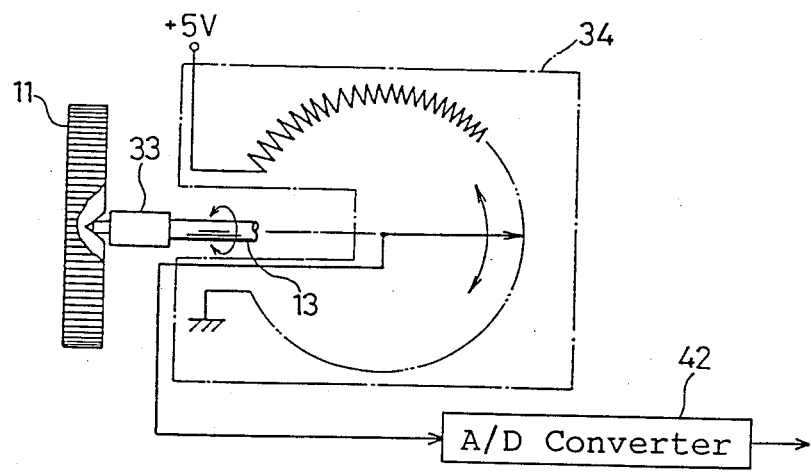

As shown in FIG. 2, a notch is formed at the center position of the adjusting range of the needle thread tension condition dial 11 (i.e., the position of setting to automatic thread tension condition), and an auto thread tension condition switch 33 operating in engagement with this notch is installed, and this auto thread tension condition switch 33 is operated (ON state) when the needle thread tension condition dial 11 is set to "AUTO", and a switch signal of the automatic mode is outputted. A thread tension condition adjust volume 34 consisting of a potentiometer is connected to a dial shaft 13 of the needle thread tension condition dial 11, and a thread tension condition signal is outputted from the thread tension condition adjust volume 34.

The following switches and keys are installed in a frame 4 of a standard 3.

Menu key 14 is for selecting pattern data (pattern information) on patterns to be sewed, sewing method data (sewing method information) explaining sewing machine operation required for sewing patterns, and using method data (using method information) on general methods of using the sewing machine, in a manner of sequential cyclic change-over.

An increase key 15 and a decrease key 16 are for selecting the next item number and the item number preceding by one when these sewing method data and using method data are displayed.

A stitch pattern/page key 17 is for selecting the next pattern data when the pattern data is displayed or for selecting the next page data where the item data is constituted with data of a plurality of pages when the item data of sewing method data and using method data are displayed.

A speed control knob 18 is for changing the sewing speed ranging from low speed to high speed.

A feed adjust knob 19 is for arbitrarily adjusting the amount of feed of fabric to be sewn.

A needle oscillation adjust knob 20 is for arbitrarily adjusting the amount of oscilation of the needle 6.

Pattern select switches 21 are ten-keys for selecting a desired stitch pattern.

A drop feed lever 22 for keeping the feed dog in the lowered state in button sewing or repair sewing and a jack 24 for connecting a foot controller 23 are installed in the frame 4 of the bed 2.

Figure 3:
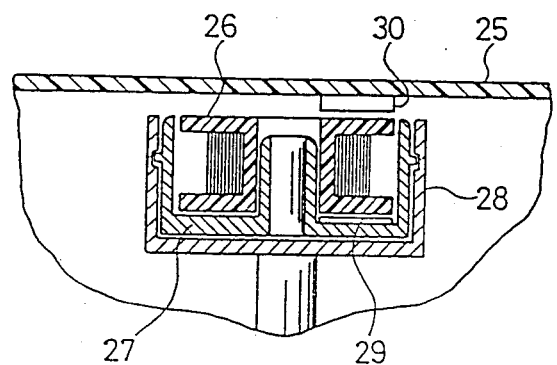

As shown in FIG. 1 and FIG. 3, beneath a slide plate 25, a bobbin case 27 housing a bobbin 26 made of transparent resin and a loop-taker 28 capable of rotating around this bobbin case 27 are installed. On the bottom surface of the slide plate 25, a publicly-known bobbin thread residual amount detecting apparatus 30 is installed which consists of a plurality of light emitting element and photoreceptors installed in a line in the radial direction of the bobbin 26, and beneath the bobbin 26 and on the inner surface of the bobbin case 27, a reflecting plate 29 reflecting the light of the light emitting element toward the photoreceptor is installed. The bobbin thread residual amount detecting apparatus 30 outputs a bobbin thread residual amount signal representing the degree of shutting the light projected from the light emitting element in response to the residual amount of the bobbin thread wound on the bobbin 26.

Figure 4A:
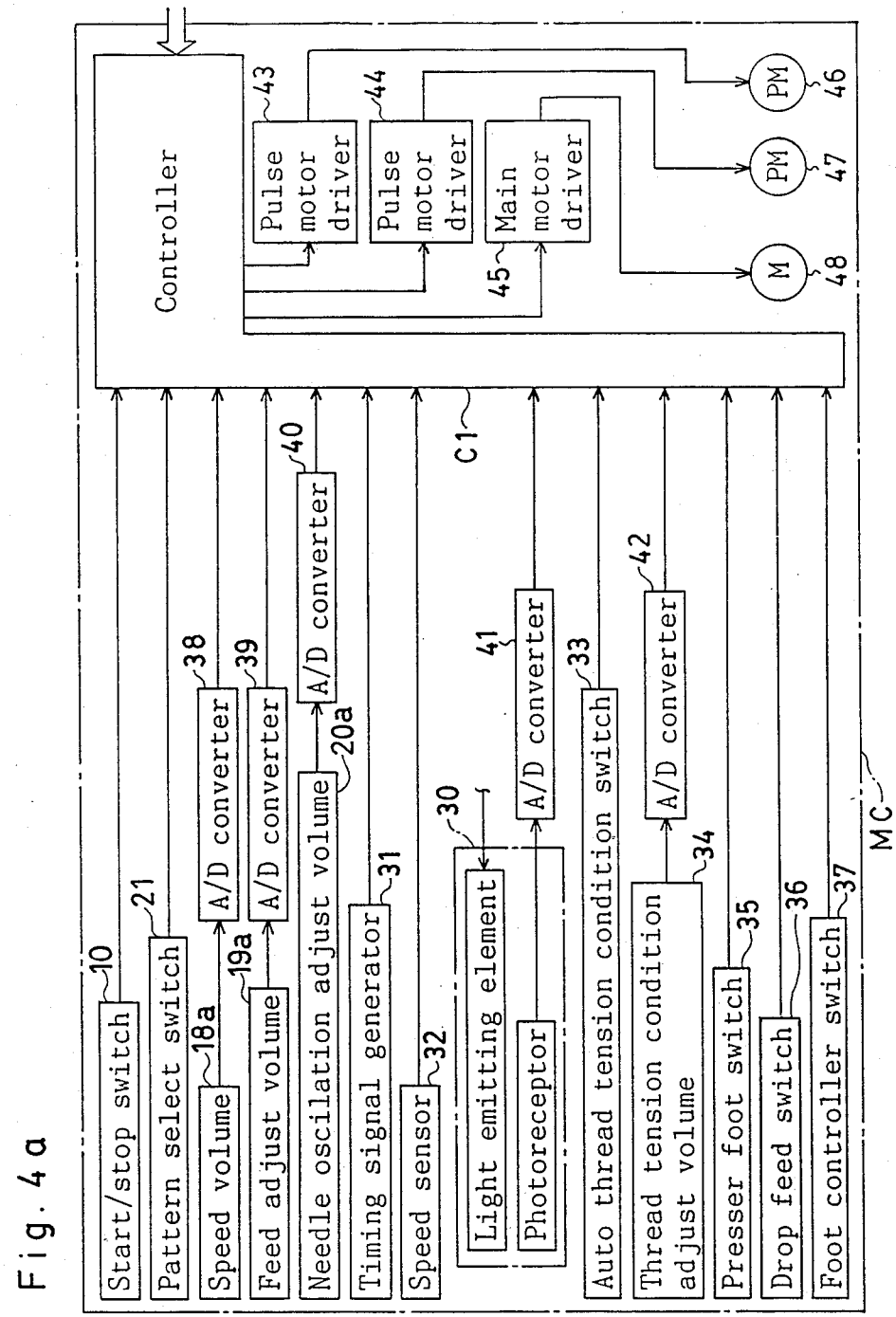
Figure 4B:
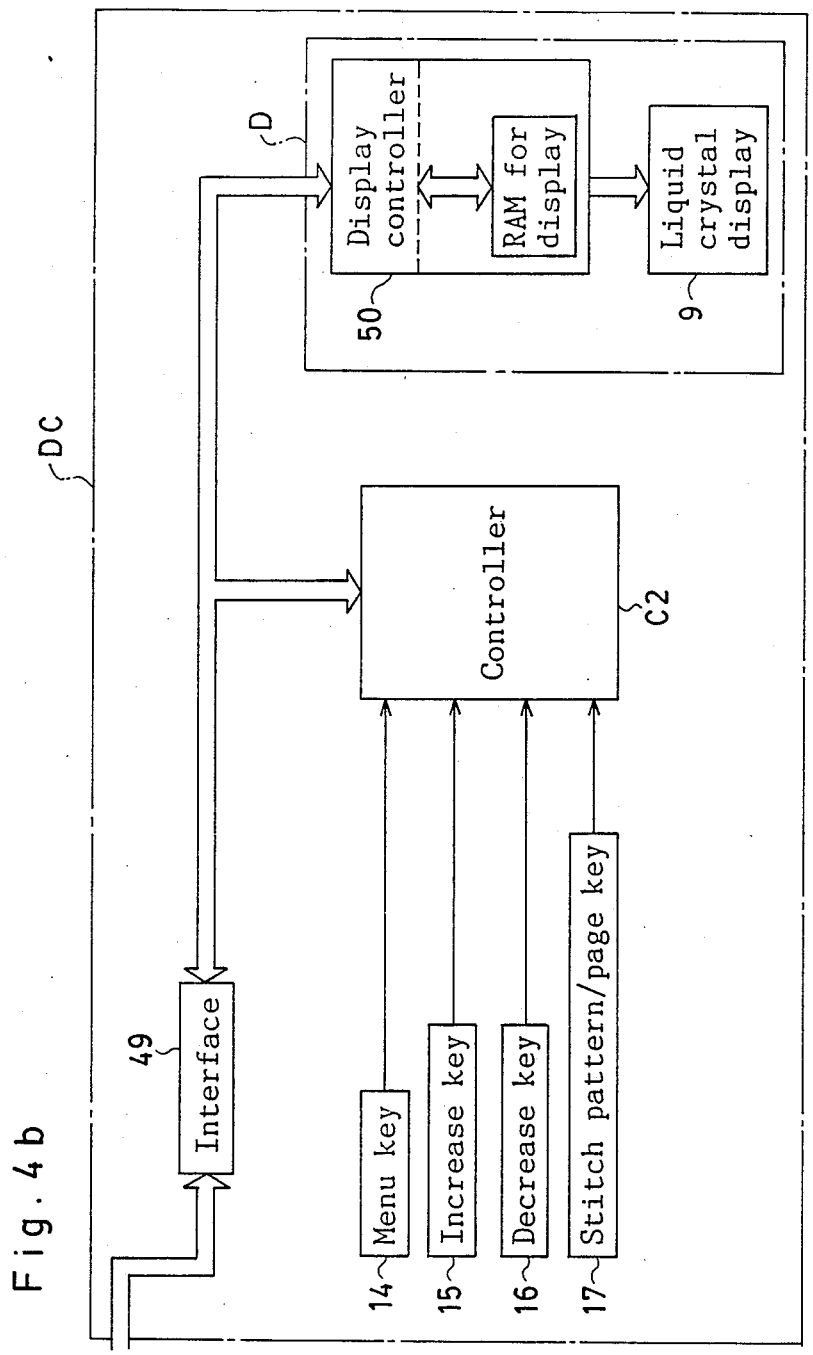
Figure 5:
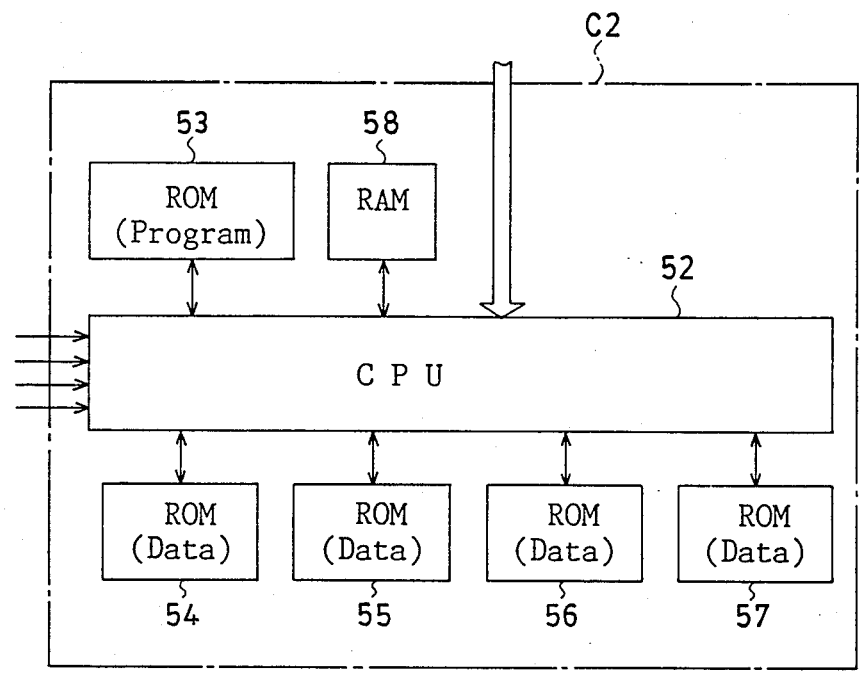
Figure 6A:
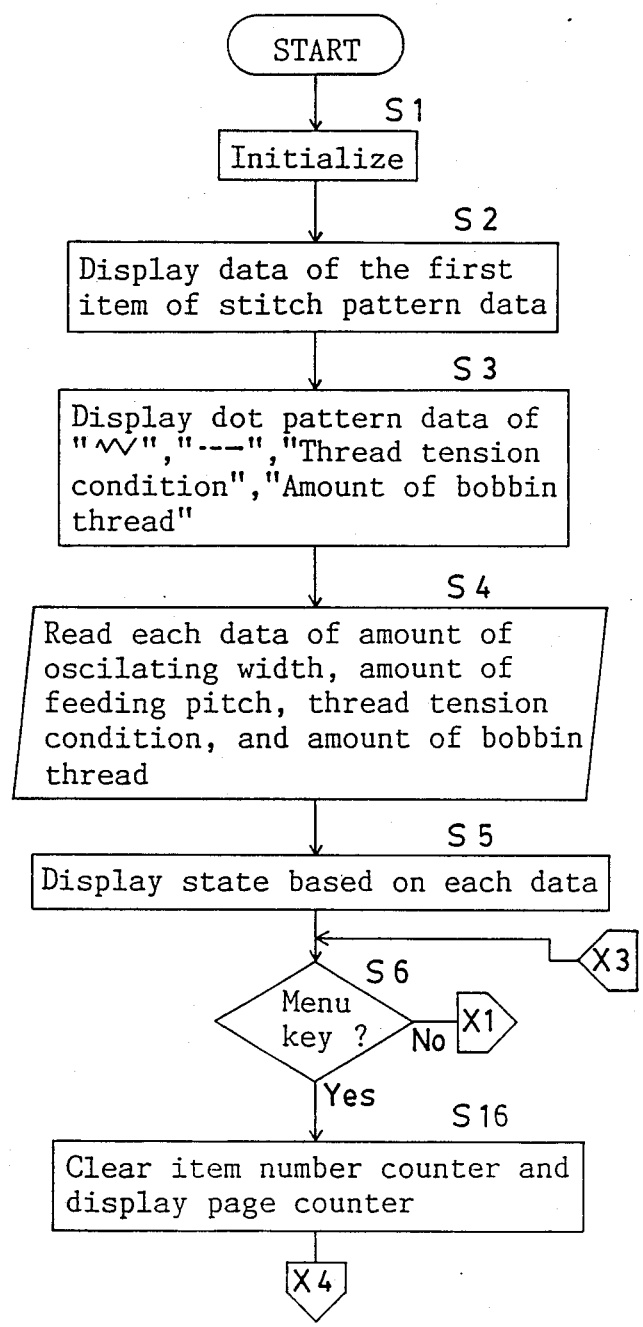
Figure 6B:
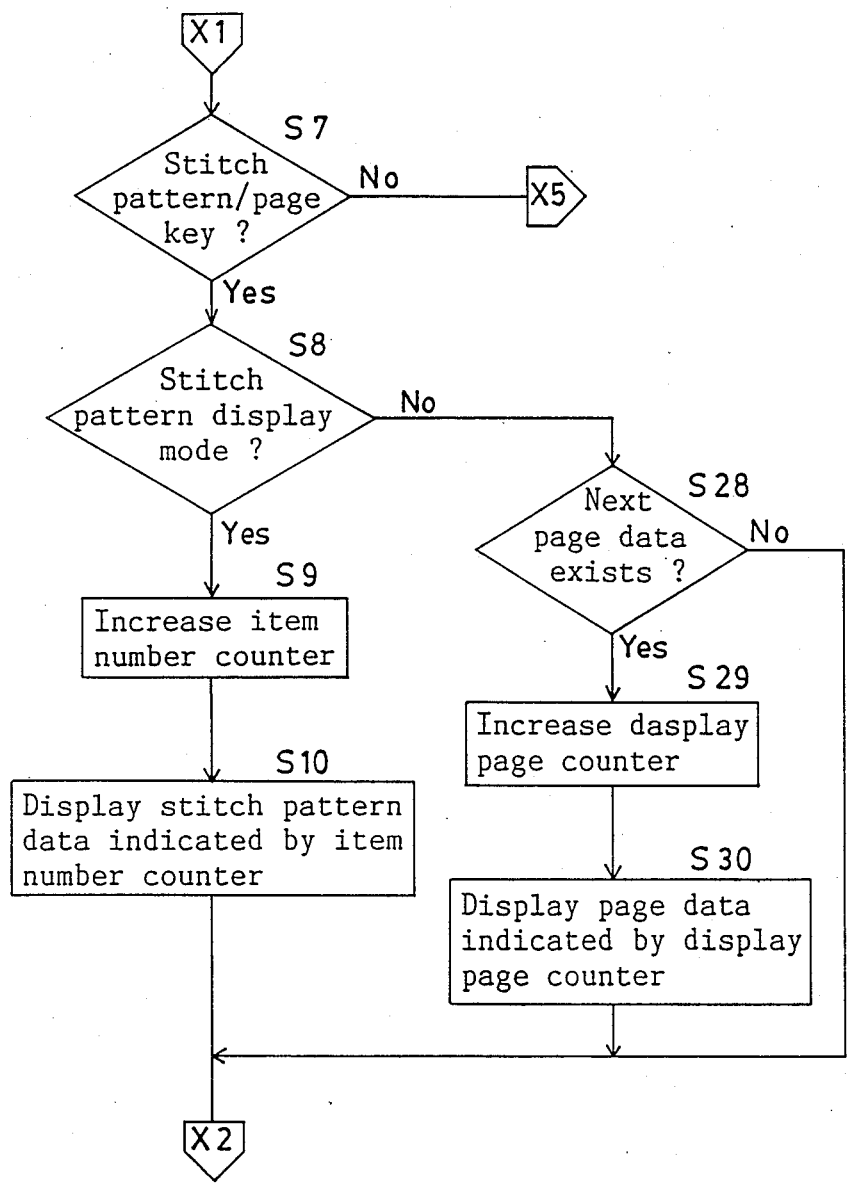
Figure 6C:
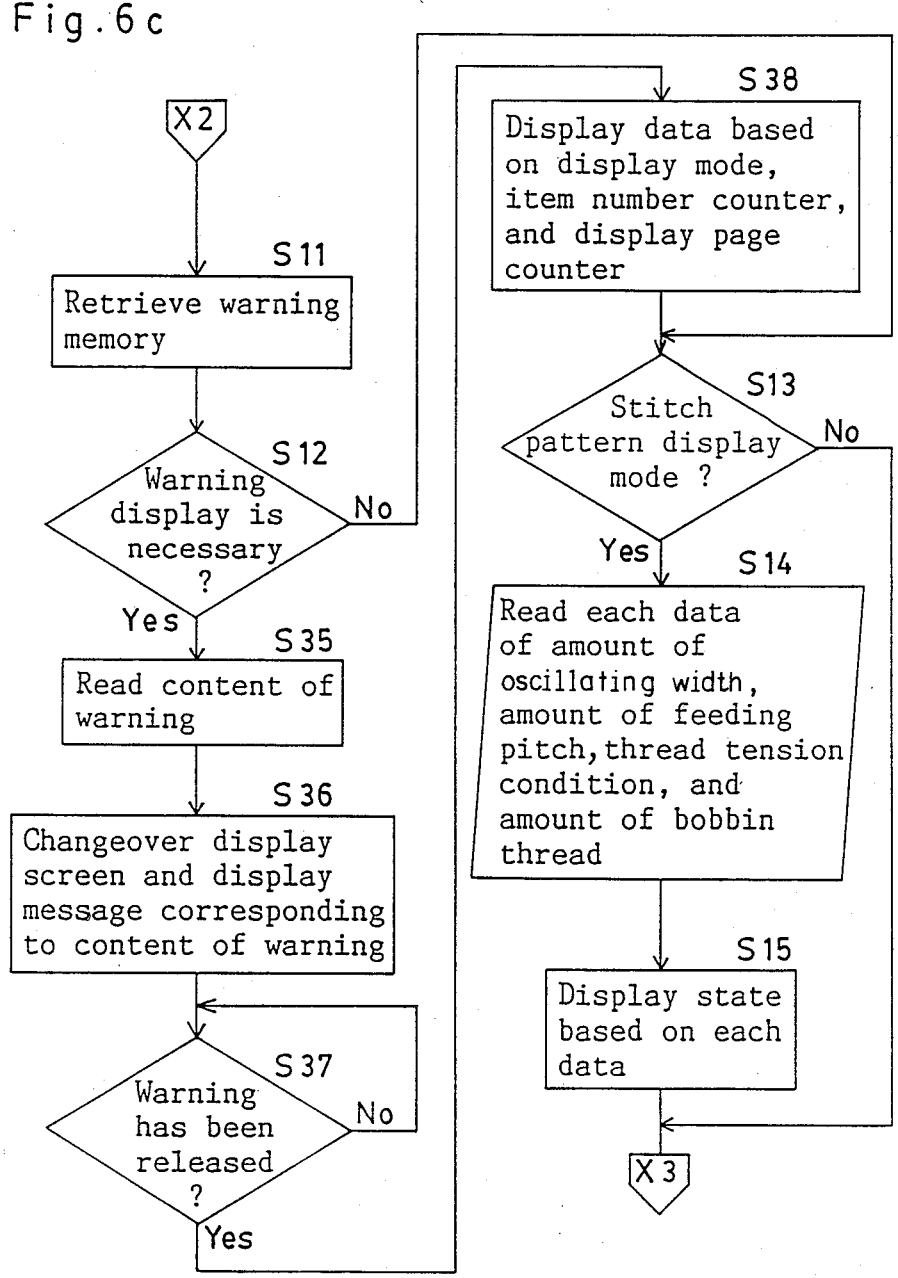
Figure 6D:
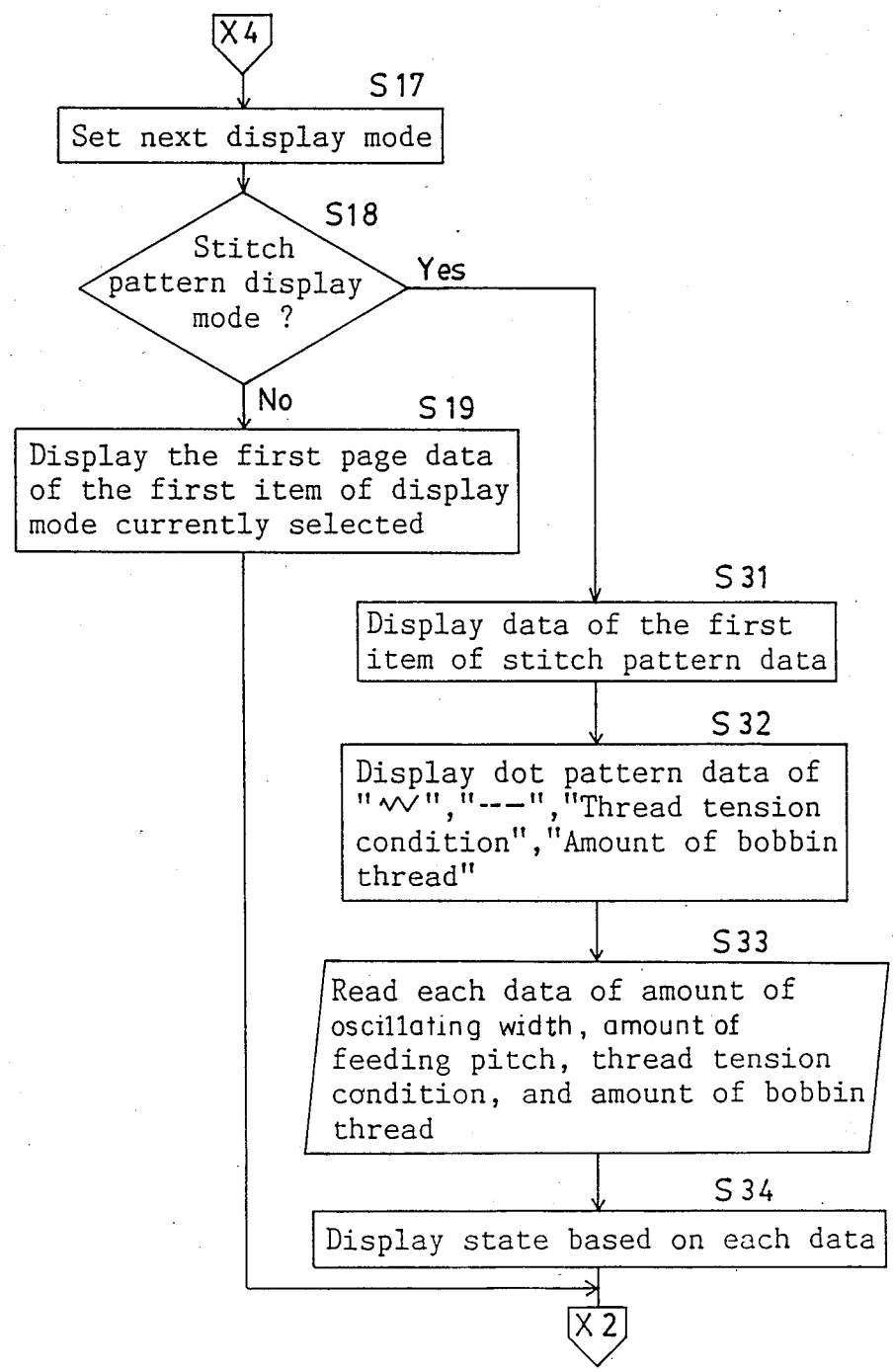

Next, description is made on the whole configuration of the control system of the sewing machine M based on block diagrams in FIG. 4 and FIG. 5.

The control system of this sewing machine M is configurated with a sewing machine control part MC and a display control part DC, and the sewing machine control part MC comprises the controlling apparatus C1 having a CPU (Central Processing Unit), a ROM (Read Only Memory) and a RAM (Random Access Memory), and the display control part DC comprises a controlling apparatus C2 having a CPU 52, ROMs 53 -57 and a RAM 58.

The sewing machine control part MC is similar to the control part of the existing zigzag sewing machine with electronic control system, and therefore brief explanation is made thereon.

The following switches and the like are connected to the controlling apparatus C1 for input signals. The start/stop switch 10 for outputting a start signal and a stop signal, the pattern select switch 21 for selecting stitch pattern, a speed volume 18a connected with the speed control knob 18 for outputting a set speed signal through an A/D converter 38, a feed adjust volume 19a connected with the feed adjust knob 19 for outputting a feed amount set signal through an A/D converter 39, a needle oscilation adjust volume 20a connected with the needle oscilation adjust knob 20 for outputting a needle oscilation amount set signal through an A/D converter 40, a timing signal generator 31 for outputting a timing signal detected by a photo-interrupter when the needle bar 5 reaches the highest position in every cycle of needle bar vertical motion, a speed sensor 32 for outputting a speed signal at every revolution of a main motor 48, the bobbin thread residual amount detecting apparatus 30 for outputting a bobbin thread residual amount signal through an A/D converter 41, the auto thread tension condition switch 33 for outputting an auto mode signal when the needle thread tension condition dial 11 is set to "AUTO", a thread tension condition adjust volume 34 for outputting a thread tension condition adjust signal through an A/D converter 42, a presser foot switch 35 which is connected to a cloth presser lever (not illustrated) moVing the presser bar 7 up and down and is for outputting a presser bar position signal representing the ascent position and the descent position of the presser bar 7, a drop feed switch 36 which is connected to the drop feed lever 22 and is for outputting a feed dog non-operation signal, a foot controller switch 37 for outputting a start signal and a stop signal every time of pressing of the foot controller 23 when the foot controller 23 is connected, and the like are connected to the controlling apparatus C1.

A pulse motor driver 43 driving a pulse motor 46 for oscilating the needle bar, a pulse motor driver 44 driving a pulse motor 47 for horizontal feed, and a main motor driver 45 driving the main motor 48 are connected to the controlling apparatus C1.

The ROM of the controlling apparatus C1 stores stitch pattern data wherein data on the amount of oscilation of the needle bar 5, the amount of horizontal feed and the direction of feed of the feed dog for every sewing operation are stored in advance in correspondence to the pattern number for a plurality of stitch patterns, a control program for controlling the pulse motor 46 for oscilating the needle bar and the pulse motor 47 for horizontal feed based on the selected stitch pattern data, the feed amount set signal from the feed adjust volume 19a and the needle oscilation amount set signal from the needle oscilation adjust volume 20a, a control program for controlling the drive of the main motor 48 in correspondence to the set speed signal from the speed volume 18a and the speed signal from the speed sensor 32 and in response to an operation of the start/stop switch 10, and the like.

The RAM of the controlling apparatus C1 comprises various memories for temporarily storing the results of operational processing in the CPU, a foot controller flag which is set when the foot controller 23 is connected, an warning data memory for storing data indicating presence or absence of warning and data showing the content of warning in a pair when the main motor 48 is not rotated despite that a drive signal is outputted to the main motor 48, or when the operator performs a wrong operation of the sewing machine, and the like.

Next, description is made on the display control part DC which performs display control in accordance with the present invention.

The display control part DC comprises an interface 49, the controlling apparatus C2, the menu keys 14, the increase key 15, the decrease key 16, the stitch pattern/page key 17, and a display mechanism D, and is connected as illustrated.

The display mechanism D is configured with a display controller 50 and the liquid crystal display 9, and the display controller 50 receives a desired display data selected by operating the keys 14-17 from the controlling apparatus C2, writes the display data to the RAM for display, and outputs the display signal corresponding to the display data to the display 9.

As shown in FIG. 5, the controlling apparatus C2 comprises the CUP 52, the ROM 53 which is connected to the CUP52 through a data bus etc. and stores various control programs, the RAM 58, the ROMs 54, 55 and 56 storing various display data, and the ROM57 storing alarm data.

The ROM 53 stores a control program for display control as described later, a control program for controlling the display mechanism D, a program for converting the set signal into a numeric value based on the needle oscilation amount set signal from the needle oscilation adjust volume 20a when the stitch pattern display mode as described later is selected, a program for converting the set signal into a numeric value based on the feed amount set signal from the feed adjust volume 19a, a program for displaying the adjusted state by an arrow based on the thread tension condition adjust signal from the thread tension condition dial 11, a program for displaying the amount of bobbin thread based on the bobbin thread residual amount signal from the bobbin thread residual amount detecting apparatus 30, data displaying "⁓", "---" "thread tension condition" and "amount of bobbin thread", dot pattern data of thread tension condition, dot pattern data of the bobbin displaying the amount of bobbin thread, and the like.

The ROM 54, relating to each of a plurality of stitch pattern data (stitch pattern information) of stitch pattern, stores the item number, name of stitch pattern, shape of stitch pattern, and kind of presser foot to be used in correspondence to one screen (hereinafter referred to as one page) of the display 9 with each dot represented by a numeric value "1" or "0". The names of the above-mentioned stitch patterns are enumerated as follows with the item number attached thereto.

1. buttonhole sewing, 2. straight stitch, 3. zigzag stitch, 4. chain stitch, 5. triple stitch, 6. decorative stitch 7. fagoting, 8. overlock stitch, 9. blind stitch, 10, shell stitch, 11. scallop stitch, 12. overcasting stitch, 13. bar tacking stitch, and so forth.

The ROM 55, relating to each of a plurality of sewing method data (sewing method information), stores the name of sewing method, explanatory note of sewing method (character information), pictures for easy understanding of the explanatory note (image information) and the page number (such as 1/1 or ½) in an item number classification fashion in correspondence to one screen of the display 9 with each dot represented by a numeric value "1" or "0". In addition, when the above-mentioned explanatory note of sewing method is long and exceeds one page, it is stored on a plurality of pages in a divided fashion. The names of sewing methods are enumerated as follows with the item number attached.

1. buttonhole sewing, 2. straight stitch, 3. zigzag stitch, 4. chain stitch, 5. triple stitch, 6. decorative stitch, 7. fagoting, 8. overlock stitch, 9. blink stitch, 10. shell stitch, 11. scallop stitch, 12. overcasting stitch, 13. bar tacking stitch, 14. fastener sewing, 15. button sewing, 16. blind stitch, 17. concealed seam, 18. patch work sewing, 19. overedge stitch, and so forth.

The ROM 56, relating to each of a plurality of using method data (using method information), stores the item number, name of using method, explanatory note of using method, pictures for easy understanding of the explanatory note and the page number (such as 1/1 or ½) in an item number classification fashion in correspondence to one page of the display 9 with each dot represented by a numeric value "1" or "0". In addition, when the explanatory note is long and exceeds one page, it is stored on a plurality of pages in a divided fashion. The names of the above-mentioned using methods ar enumerated as follows with the item number attached.

1. how to set needle thread, 2. how to wind bobbin thread, 3. how to draw out bobbin thread, 4. how to adjust the thread tension condition dial, 5. how to replace the presser foot, 6. how to replace the needle, 7. how to attach the side cutter, 8. how to replace the lamp, 9. how to care and oil the sewing machine, and so forth.

The ROM 57, relating to each of a plurality of warning data (warning information), stores the content of warning, explanatory note for releasing the warning, pictures for easy understanding of the explanatory note in an warning content classification fashion in correspondence to one page of the display 9 with each dot represented by a numeric value "1" or "0". Examples of the above-mentioned contents of warnings and explanatory notes for releasing the warnings are shown as follows.

<The motor has been locked!!>

Check for the causes in sequence.
Check whether the needle is bent or snapped or not.
Check whether the thread is got entangled in the looptaker or not.
Check whether dust collects around the feed dog or not.

<The sewing machine cannot start because the presser foot is lifted!!>

Lower the presser foot, and then operate the start/-stop switch again.

<The sewing machine cannot start because the feed dog is lowered!!>

When sewing this pattern, fabric is fed by the feed dog.
Slide the drop feed lever to the right, and then operate the start/stop stitch.

<The foot controller is being used!!>

Start or stop the sewing machine by the foot controller because the foot controller is being connected.

The RAM 58 comprises a display mode memory for storing the selected display mode when the stitch pattern display mode displaying the stitch pattern data on the display 9, the sewing method display mode displaying the sewing method data on the display 9, and the using method display mode displaying the using method data on the display 9 are switched-over sequentially in a cyclic manner by operating the menu key 14, an item number counter indicating the item number when the sewing method data or the using method data is displayed, a display page counter indicating the page to be displayed when the item data of the sewing method data or the using method data is constituted with a plurality of pages, a plurality of memories for temporarily storing the result of operational processing in the CPU 52, and the like.

Next, description is made on routines of display control performed by the controlling apparatus C2 of the control part DC of the sewing machine based on flow charts in FIG. 6a through 6e.

By turning on the power switch (not illustrated), this control is started, and processing proceeds to step S1, and the stitch pattern display mode is set in the display mode memory, and initialization is executed such that the item number counter and the display page counter are cleared, and processing proceeds to step S2. In step S2, data of the first item of the stitch pattern data is displayed on the display 9 based on the stitch pattern data and the data of the item number counter of the ROM 54. In step S3, dot pattern data of "〰", "---"]"thread tension condition", "amount of bobbin thread" are read from the ROM 53, being displayed on the display 9. In step S4, the oscilating width amount data is read based on the needle oscilation amount set signal from the needle oscilation adjust volume 20a, the feed pitch amount data is read based on the feed amount set signal from the feed adjust volume 19a, the thread tension condition data is read based on the thread tension condition adjust signal from the thread tension condition adjust volume 34, and the bobbin thread amount data is read based on the bobbin thread residual signal from the bobbin thread residual amount detecting apparatus 30. In step S5, each item is displayed at each predetermined positions of the display 9 based on each data now read. For example, as shown in FIG. 7(a), the item number "1", the name of stitch pattern "buttonhole sewing" the shape of stitch pattern and the kind of presser foot to be used are displayed on the display 9, and a numeric value "5" of the amount of oscilating width, a numeric value "3" of the feed pitch, the adjusted state of thread tension condition (shown by an arrow), and the amount of bobbin thread are displayed at each predetermined display positions of the display 9, respectively. In addition, when the needle thread tension condition dial 11 is set to "AUTO", "AUTO" is displayed as the state of thread tension condition by the auto mode signal from the auto thread tension condition switch 33.

Here, when the stitch pattern/page key 17 is depressed to display the next stitch pattern, judgment of whether or not the key operated in step S6 is the menu key 14 results in "No", and in the following step S7, judgment is made to be "Yes", and processing proceeds to step S8.

In step S8, whether or not the pattern display mode has been set is judged based on data of the display mode memory, and when the stitch pattern display mode has been set, processing proceeds to step S9. In step S9, data of the item number counter is increased, and in step S10, the stitch pattern data corresponding to the item indicated by the item number counter is displayed, and processing proceeds to step S11.

In step S11, data of the warning data memory of the RAM of the controlling apparatus C1 is retrieved. In the next step S12, judgment is made on whether or not the warning display is required to be made based on the data indicating presence or absence of warning of the warning data memory, and when no warning display is required to be made, processing proceeds to step S13. In step S13, judgment is made on whether or not the stitch pattern display mode has been set, and when this mode has been set, processing proceeds to step S14. Step S14 and step S15 are similar to the above-mentioned step S4 and Step S5, and when the amount of oscilating width, the feed pitch or the like is changed, the latest set data after this change is displayed on the display 9, and processing returns to step S6. In addition, when judgment results in "No" in step S13, processing returns to step S6.

Next, when the menu key 14 is depressed to display the sewing method data, judgment is made to be "Yes" in step S6, and processing proceeds to step S16.

In step S16, the item number counter and the display page counter are cleared. In step S17, the next display mode is set based on the data of the display mode memory. This means that when the stitch pattern display mode has been set, the next sewing method display mode is set, when the sewing method display mode has been set, the next using method display mode is set, and when the using method display mode has been set, the next stitch pattern display mode is set.

Figure 7B:
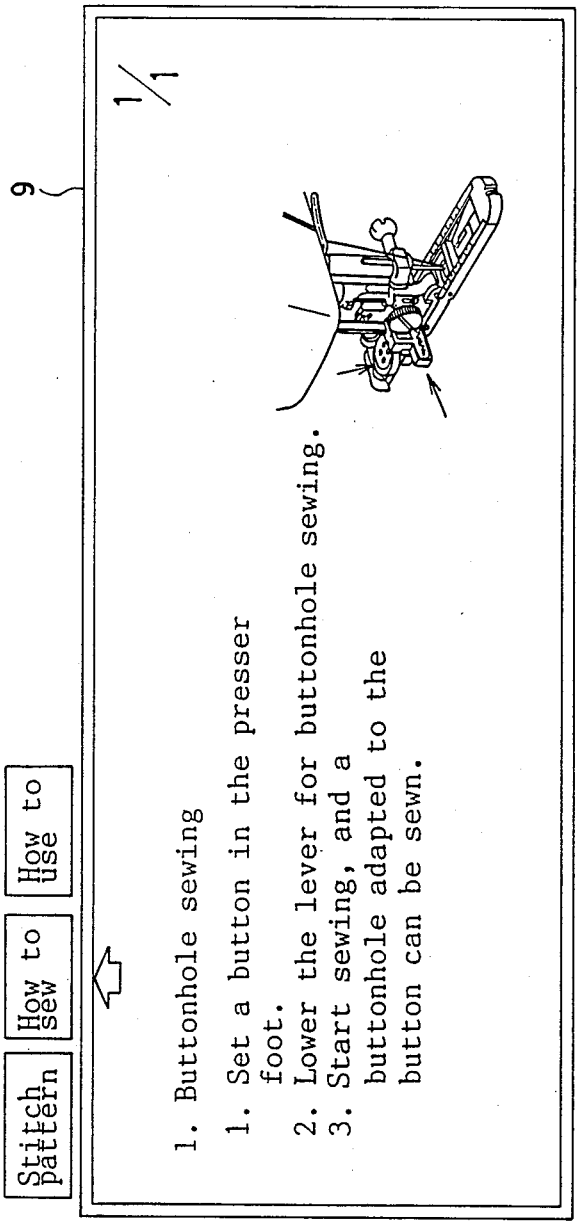
Figure 7C:
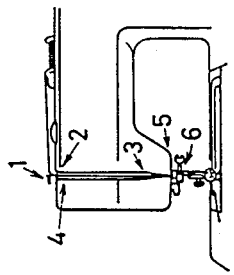

In step S18, judgment is made on whether or not the stitch pattern display mode has been set, and when the judgment results in "No", processing proceeds to step S19, and data of the first page of the first item of the sewing method data or the using method data corresponding to the currently selected display mode (the sewing method display mode or the using method display mode) is displayed based on the sewing method data of the ROM 55 and the using method data of the ROM 56, and step S11–step S15 are executed, and processing returns to step S6. For example, when the sewing method display mode is selected, as shown in FIG. 7b, the item number "1", the name of sewing method "buttonhole sewing", the explanatory note for its sewing method, pictures for easy understanding of the explanation, and the page number are displayed. When the using method display mode is selected, as shown in FIG. 7c the item number "1", the name of using method "how to set needle thread", the explanatory note for its using method, pictures for easy understanding of the explanatory note and the page number are displayed.

When the sewing method display mode or the using method display mode is selected, if the increase key 15 is depressed to display data of the next item, processing proceeds through step S6 and step S7, and in step S20, judgment is made to be "Yes", and processing proceeds to step S21.

In step S21, judgment is made on whether or not the stitch pattern display mode has been set, and when the sewing method display mode or the using method display mode has been selected, processing proceeds to step S22. In step S22, the item number counter is increased, and in step S23, the page counter is cleared. In step S24, data of the first page of the item data indicated by the item number counter of the sewing method data or the using method data corresponding to the currently selected display mode (the sewing method display mode or the using method display mode) is displayed, and step S11 through step S15 are executed, and processing returns to step S6. For example, where the sewing method display mode has been selected, when "1. buttonhole sewing" has been displayed, the next "2. straight stitch" is displayed, and when "2. straight stitch" has been displayed, the next "3. zigzag stitch" is displayed, and thereafter the item number, the name of sewing method and the like are displayed likewise. Where the using method display mode has been selected, when "1. how to set needle thread" has been displayed, the next "2. how to wind bobbin thread" is displayed, and when "2. how to wind bobbin thread" has been displayed, the next "3. how to draw out bobbin thread" is displayed, and thereafter the item number, the name of using method and the like are displayed likewise.

When the sewing method display mode or the using method display mode has been selected, if the decrease key 16 is depressed to display the data of the item preceding by one, processing proceeds through step S6–step S7 and step S20, and in step S25, judgment is made to be "Yes", and processing proceeds to step S26.

In step S26, judgment is made on whether or not the stitch pattern display mode has been selected, and when the sewing method display mode or the using method display mode has been selected, processing proceeds to step S27. In step S27, the item number counter is decreased, and processing proceeds to step S23, returning to step S6 via step S23–step S24 and step S11–step S15. This means that data of the first page of the data of the item preceding by one is displayed in a sequence reverse to the sequence when the increase key 15 is depressed. In addition, when judgment is made to be "Yes" in step S21 or step S26, processing proceeds to step S11.

When the sewing method display mode or the using method display mode has been selected, in the case where the displayed item data is constituted with a plurality of pages, when the stitch pattern/page key 17 is operated to display the page data of the next page, processing proceeds through step S6, and in step S7 judgment is made to be "Yes", and processing proceeds to step S8. In step S8, judgment is made to be "No", and processing proceeds to step S28. In step S28, judgment is made on whether or not the next page data is present based on the data of the display page counter, and when the next page data is present, processing proceeds to step S29. In step S29, the display page counter is increased, and in step S30, page data indicated by the display page counter is displayed, and processing proceeds to step S11.

Where the menu key 14 is depressed, and judgment is made to be "Yes" in step S6, and the stitch pattern display mode is selected in the display mode memory in step S16–step S17, judgment results in "Yes" in step S18, and processing proceeds to step S31. Step S31–step S34 are routines for displaying the latest oscilating width, feed pitch and the like, and are similar to step S2–step S5, and therefore the description thereon is omitted.

On the other hand, when controls of the main motor 48 and others are being performed by the controlling apparatus C1, for example, if the main motor 48 does not rotate despite that the main motor 48 has been commanded to rotate by operating the start/stop switch 10 the controlling apparatus C1 judges that the main motor 48 has been locked based on a timing signal from the timing signal generator 31 and a speed signal from the speed sensor 32, and writes data indicating presence of warning and data showing the content of warning to the warning data memory. At this time, in step S12, judgment is made to be "Yes", and processing proceeds to step S35.

Figure 7D:
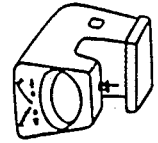

In step S35, the data showing the content of warning of the warning data memory is read. In step S36, the display screen is changed-over, and display data of the content of warning corresponding to the data showing the content of warning based on the warning data of the ROM 57 is displayed on the display 9. In step S37 judgment is made on whether or not the warning has been released, and when the warning has not been released, step S37 is repeated. For example, as shown in FIG. 7d, the content of warning "motor has been locked!!" and the explanatory note for releasing the warning are displayed. When the operator eliminate the cause of motor locking based on the explanatory note, and operates the start/stop switch 10 again, the controlling apparatus C1 clears the data indicating warning and the data showing the content of warning from the warning data memory, and therefore the warning is released, and judgment results in "Yes" in step S37, and processing proceeds to step S38. In step S38 the data having been displayed immediately before display of the content of warning is displayed based on data of the display mode of the display mode memory the item number counter and the display page counter, and processing proceeds to step S13.

Furthermore, description is made on examples of displays of other contents of warning in relation to step S12 and step S35–step S36.

Where the main motor 48 is driven by operating the start/stop switch 10 in the state that the presser foot 8 is lifted, the controlling apparatus C1 writes the data indicating the state of warning and the data showing the content of warning to the warning data memory based on the needle bar position signal from the presser foot switch 35 and the start and stop signals from the start/stop switch 10, and the content of warning "the sewing machine cannot start because the presser foot is lifted!!" and the explanatory note for releasing the warning are displayed.

On the other hand, where a stitch pattern requiring fabric feed is selected in the state that the feed dog is lowered and the start/stop switch 10 is operated, the controlling apparatus C1 writes the data indicating the state of warning and the data showing the content of warning to the warning data memory based on the feed dog non-operation signal from the drop feed switch 36 and the start and stop signals from the start/stop switch 10, and the content of warning "the sewing machine cannot start because the feed dog is lowered!!" and the explanatory note for releasing the warning are displayed.

As described above, the data relating to the stitch pattern, the data relating to the sewing method, or the general instructing data relating to the method of using the sewing machine is selected by operating the keys 14–17, and is displayed on the display 9, and therefore the operationability and the working efficiency with the sewing machine are improved.

What is claimed is:

1. An information display apparatus for a sewing machine comprising:
   an information memory means for storing various classifications of sewing machine information in a classified manner, each of said various classifications of sewing machine information including a plurality of subclassifications, one of said various classifications of information being general instructing information on methods of using a sewing machine, each said plurality of subclassifications of said general instructing information including information on a name of a method of using the sewing machine, explanatory notes for said method of using the sewing machine and an image for easy understanding of said explanatory notes, said various classifications of information being stored in a form of dot-pattern data,
   a selecting means for selecting one of said various classifications of sewing machine information from said information memory means and for selecting one of said plurality of subclassifications of information of a selected one of said various classifications of sewing machine information,
   a display installed in said sewing machine to display said subclassification of information selected by said selecting means, said display including a liquid crystal display of a multi-row and multi-column dot pattern configuration, and.
   a display controlling means which reads said subclassification of information selected by said selecting means from said information memory means and outputs it to said display for display.

2. An information display apparatus for a sewing machine in accordance with claim 1, wherein one of said various classifications of information comprises explanatory information explaining methods of sewing required for sewing a plurality of stitch patterns, each of said plurality of subclassifications of explanatory information including information on a name of a method of sewing a stitching pattern, explanatory notes for said method of sewing said stitching pattern, and an image for easy understanding of said explanatory notes, said explanatory information being stored in a form of dot-pattern data.

3. An information display apparatus for a sewing machine in accordance with claim 1, wherein one of said various classifications of information comprises stitch pattern information explaining a plurality of stitch patterns, each of said plurality of subclassifications of said stitch pattern information including information on a name of a stitch pattern, an image of said stitch pattern and a kind of a required presser foot, said stitch pattern information behind stored in a from of dot-pattern data.

4. An information display apparatus for a sewing machine in accordance with claim 1, wherein said information memory means further stores plural kinds of warning information for warning at an occurrence of abnormal state.

5. An information display apparatus for a sewing machine in accordance with claim 1, wherein said instructing information comprises character display information to be displayed by characters and image display information to be displayed by said image, said character display information and said character display information and said image display information being stored in said information memory means in a form of dot-pattern data.

6. An information display apparatus for a sewing machine in accordance with claim 2, wherein said explanatory information comprises character display information to be displayed by characters and image display information to be displayed by said image, said character display information and said image display information being stored in the information memory means in a form of dot-pattern data.

7. An information display apparatus for a sewing machine in accordance with claim 1, wherein said generally instructing information includes general instructing information on at least two of a method of setting a needle thread, a method of winding a bobbin threads, a method of a drawing out a bobbin thread, a method of adjusting a thread tension condition dial, a method of replacing a presser foot, a method of replacing a needle, a method of attaching a side cutter, a method of replacing a lamp, and a method of caring and oiling the sewing machine.

* * * * *